United States Patent [19]
Petersen et al.

[11] 3,784,170
[45] Jan. 8, 1974

[54] SAMPLE CELL AND STIRRER THEREFOR

[75] Inventors: Arnie J. Petersen, Newport Beach; Jack L. Hoffa, Brea, both of Calif.

[73] Assignee: Beckman Instruments Inc., Fullerton, Calif.

[22] Filed: Jan. 20, 1972

[21] Appl. No.: 219,474

[52] U.S. Cl. .......................... 259/65, 259/DIG. 46
[51] Int. Cl. .............................................. B01f 7/02
[58] Field of Search .................. 259/1, DIG. 46, 64, 259/65, 66, 67, 68, 69, 102, 103, 106, 107, 108, 109, 5, 7, 8

[56] References Cited
UNITED STATES PATENTS

| | | | |
|---|---|---|---|
| 2,773,747 | 12/1956 | King | 259/DIG. 46 |
| 2,999,673 | 9/1961 | Kessler | 259/DIG. 46 |
| 3,680,843 | 8/1972 | Madyeh | 259/64 |

Primary Examiner—Robert W. Jenkins
Attorney—Thomas L. Peterson et al.

[57] ABSTRACT

A sample cell for use in a spectrophotometric instrument and a stirrer for mixing sample and reagent in the cell. The cell is formed with closely spaced parallel planar sidewalls and two end walls of radiation permeable material. The cell is disposed so that the end walls lie in the optical path defined between the source of radiation and the radiation detector in the instrument. A stirring element is positioned in the cell with its magnetic axis parallel to the sidewalls of the cell. A rotatable drive magnet is positioned outside of the cell so as to rotate the stirring element about an axis perpendicular to the sidewalls so that the plane of rotation of the stirring element is parallel to the sidewalls. A plurality of such cells may be stacked in parallel relationship and a single drive magnet employed to rotate stirring magnets in the cells.

3 Claims, 5 Drawing Figures

PATENTED JAN 8 1974 3,784,170

SAMPLE CELL AND STIRRER THEREFOR

BACKGROUND OF THE INVENTION

1. Field of the Invention

This invention relates generally to a sample cell and a stirrer therefor and, more particularly, to a sample cell for use in a spectrophotometric instrument and a stirrer for mixing solutions within the cell.

2. Description of the Prior Art

In qualitative and quantitative analysis increasing use is being made of spectrophotometric and optical methods which require the use of extremely precise and extensive electro-optical and optical devices. In most instruments of this type, a beam of light is passed through a glass cell containing a solution of the sample to be analyzed and the degree of optical change in the beam of light as it passes through the sample is measured in one way or another. Usually, the beam of light is monochromatic and of carefully controlled intensity. In some types of analytical work, the beam of light is split by prisms into equal parallel beams which are directed through two glass cells, one containing the sample and one containing a reference solution of known optical characteristics, so that the sample can be analyzed comparatively with respect to the reference. It will of course be appreciated that one of the critical elements in all instruments of this type is the sample cell and the condition of the liquid sample being analyzed in the cell.

For some recently developed spectrophotometric and optical analyses, it is necessary to add a reagent to the sample in the cell and to mix the same together. The conventional spectrophotometric cell has a cylindrical configuration. Normally, to mix solutions in a cylindrical cell, a stirring magnet is positioned in the bottom of the cell with its magnetic axis lying horizontally. A driving magnet is positioned below the cell to rotate the stirring magnet in a horizontal plane. This form of stirrer, however, has the disadvantage that it causes vortexing at the top of the solution in the cell which sometimes causes bubbles and particulate matter to be drawn downwardly into the cell thereby adversely affecting optical transmission through the cell, notably seen as a noisy output signal from the detector. In addition, when more than one of such cells is employed, as when a reference cell is utilized together with a sample cell, each cell requires an individual drive magnet for rotating the stirring magnet in the cell. British Pat. No. 961,124 discloses a stirrer for a cylindrical spectrophotometric sample cell. The stirrer comprises a piece of magnetic metal of irregular configuration which is agitated in the cell by means of an external coil supplied with alternating current of suitable frequency. Mixing by such means is not as effective as a rotating magnetic stirrer. Moreover, since the aforementioned cells have a cylindrical configuration, they require relative large quantities of sample and reagent due to the large volumes of the cells. The relatively large quantity of sample required for such cells materially limits the application of spectrophotometric and optical methods to analysis of biological fluids, such as blood or serum samples, and the like, inasmuch as the quantity of biological fluid available for analysis is usually small. In many cases, it is impossible or at least highly undesirable to withdraw more than a few milliliters of a biological fluid from the patient for analytical purposes. In addition, reagents utilized in the spectrophotometric analysis of biological fluids are usually quite expensive. The use of conventional cylindrical sample cells, due to their large volumes, renders such analyses impractical from a cost standpoint due to the large quantities of reagent required. Thus, conventional cells and stirrers therefor are undesirable for spectrophotometric analyses not only because of the disadvantages attendant with the use of a horizontally rotating stirring element in the cells, but also because of the large volumes of the cells. The purpose of the present invention is to provide a spectrophotometric cell and stirrer therefor which will overcome the aforementioned disadvantages in conventional spectrophotometric sample cells.

SUMMARY OF THE INVENTION

The principal object of the present invention is to provide an improved sample cell and stirrer therefor.

According to the principal aspect of the present invention, there is provided a sample cell for use in a spectrophotometric instrument and a stirrer for mixing sample and reagent in the cell. The cell is formed with closely spaced parallel planar sidewalls and two end walls of radiation permeable material. The cell is disposed so that the end walls lie in the optical path defined between the source of radiation and the radiation detector in the instrument. A stirring element is positioned in the cell with its magnetic axis parallel to the sidewalls of the cell. A rotatable drive magnet is positioned outside of the cell so as to rotate the stirring element about an axis perpendicular to the sidewalls so that the plane of rotation of the stirring element is parallel to the sidewalls. A plurality of such cells may be stacked in parallel relationship and a single drive magnet employed to rotate stirring magnets in the cells. This form of cell and stirrer eliminates vortexing of solution in the cell and provides good circulation and mixing of the solution. Also, because of the configuration of the cell, only relatively small quantities of sample and reagent are required to perform an analysis in the cell. Still further, because a plurality of cells may be stacked in parallel relationship and the magnetic stirring elements therein rotated by a single drive magnet, the necessity for separate drive magnets for each cell is eliminated and the stirring elements in all the cells are rotated in synchronism and at the same speed of rotation so that uniform mixing is achieved in the cells.

DESCRIPTION OF THE PREFERRED EMBODIENTS

Figure 1:
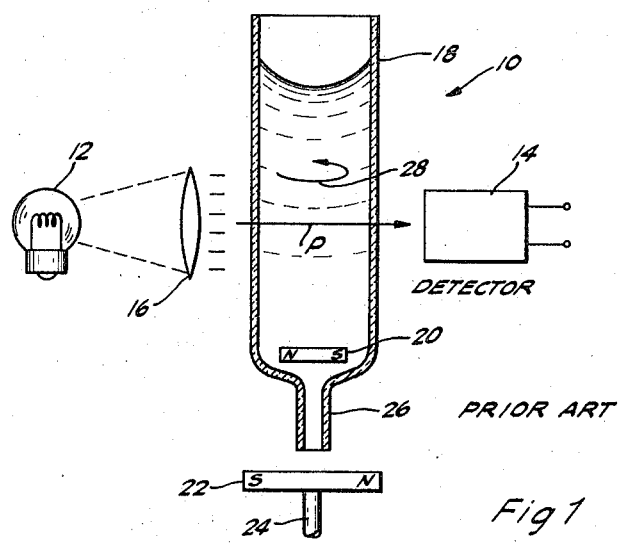
FIG. 1 is a diagrammatic illustration of a spectrophotometer employing a conventional cylindrical sample cell, shown in vertical longitudinal section, and a standard magnetic stirrer therefor.

As has been previously pointed out, there are various types of spectrophotometric and optical analytical instruments all of which operate upon the same general principal, that is, a solution of sample is placed within a sample cell and disposed in the path of a beam of light or other radiation. The spectrophotometric system shown diagrammatically in FIG. 1, generally indicated by reference numeral 10, is substantially representative of most forms of spectrophotometric instruments, and in its broadest aspect consists of a source of radiation 12 and a radiation detector 14. A lens 16 is positioned adjacent to the source 12 so that radiation emanating therefrom will following a predetermined optical path indicated by arrow P to the detector 14. The radiation source 12 and detector 14 are normally provided with electrical and electronic circuitry, but no effort is made herein to show or discuss such circuitry since, for the purposes of the present invention, such circuitry is entirely conventional. Suitably interposed between the source 12 and the detector 14 is a conventional sample cell 18 which is formed of radiation permeable materal such as quartz or Pyrex glass having known or predetermined optical characteristics. The sample to be analyzed is placed in the cell and the amount of opitcal change effected in the radiation beam is measured. In most types of spectrophotometric equipment, the amount of radiation absorbed by the sample is measured in accordance with Beer's law. In other types of equipment, colorimetric variations and changes may be noted and measured or recorded in one way or another. It is merely sufficient to note that the cell 18 must be filled with a sufficient quantity of liquid so that a beam of radiation of known cross-sectional area will pass through the liquid for a predetermined distance.

Figure 2:
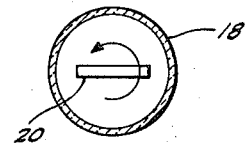
FIG. 2 is a top plan view of the sample cell illustrated in FIG. 1.

The cell 18, being of the conventional type as discussed previously herein, has a cylindrical cross section as best seen in FIG. 2. A conventional stirrer arrangement is provided in which the stirring element 20 in the cell 18 comprises a horizontally disposed permanent magnet having poles at its opposite ends as indicated in FIG. 1. Thus, the magnetic axis of the stirring element 20 is generally perpendicular to the longitudinal axis of the cell 18. A drive magnet 22 is positioned below the cell 18. The drive magnet is fixed to the drive shaft 24 of a motor, not shown. The shaft 24 is coaxial with the longitudinal axis of the cell 18. Hence, when the drive magnet 22 is rotated by the shaft 24, the element 20 will rotate in a horizontal plane about the longitudinal axis of the cell 18 as indicated by the arrow in FIG. 2. Preferably the element 20 is coated with a hydrophobic plastic material such as polytetrafluoroethylene or polypropylene to prevent reaction between the magnet and the sample or reagent introduced into the cell 18. The cell is formed at its lower end with a port 26 which permits introduction of reagent into the cell and withdrawal of sample-reagent mixture from the cell following spectrophotometric analysis thereof. As discussed previously, by the use of a horizontally disposed magnetic stirrer 20 as shown in FIG. 1, vortexing occurs at the upper portion of the liquid in the cell 18, as indicated by arrow 28. Such vortexing pulls bubbles and particulate matter down into the optical path P of the spectrophotometer 10, thus adversely affecting optical transmission through the cell, usually evidenced by a noisy output from the detector 14. In addition, because the cell 18 is of cylindrical configuration, relatively large quantities of sample and reagent are required for optical analysis of sample.

Figure 3:
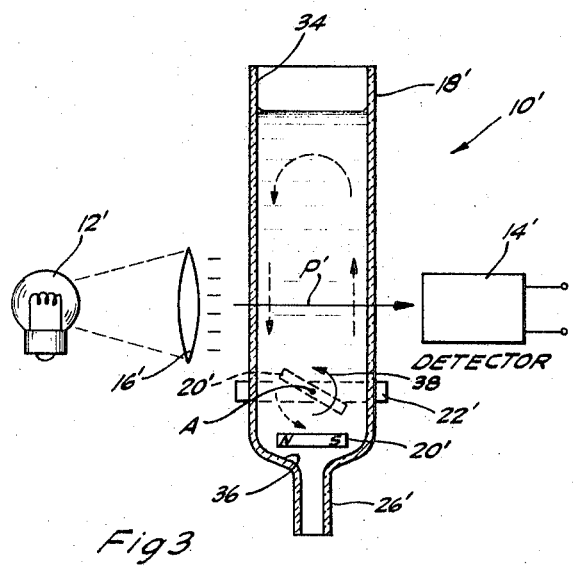
FIG. 3 is a diagrammatic illustration of a spectrophotometer incorporating the sample cell and stirrer of the present invention, such cell being shown in vertical section taken through the radiation permeable walls of the cell.
Figure 4:
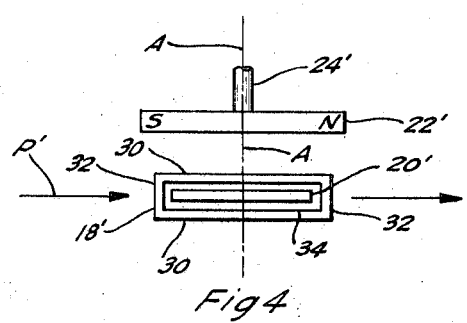
FIG. 4 is a top plan view of the cell and stirrer illustrated in FIG. 3.

Reference is now made to FIGS 3 and 4 of the drawing which illustrate a spectrophotometric or optical instrument 10' employing a sample cell and stirrer constructed in accordance with the present invention. In describing the instrument 10', those parts similar or corresponding to those described in connection with the instrument 10 illustrated in FIG. 1 have been given identical reference numerals primed. The cell 18' of the present invention is provided with a pair of closely spaced, substantially parallel planar sidewalls 30 and two parallel relatively narrow end walls 32 defining therebetween a vertically extending elongated sample chamber 34 of rectangular cross section. The entire walls of the cell 18' may be formed of radiation permeable material such as quartz, Pyrex glass, etc., but in practicing the present invention it is only necessary that the end walls 32 be formed of these materials. The cell 18' is interposed between the radiation source 12' and detector 14' so that the optical path P' passes through the radiation permeable walls 32 of the cell, and thus the path lies parallel to the sidewalls 30 of the cell. By this configuration of the cell 18' and its positioning in the spectrophotometric apparatus 10', the radiation from the source 12' transverses through as great an amount of liquid in the cell 18' as in the cell 18, yet the amount of liquid required for filling the cell is substantially less, thus permitting the use of much smaller quantities of sample and reagent than the prior cylindrical cells.

Further in accordance with the present invention, the magnetic stirring element 20°, which is identical to the element 20 illustrated in FIGS. 1 and 2, is normally positioned to lie on the lower surface 36 of chamber 34 in the cell. However, the drive magnet 22', rather than being positioned below the cell as in the prior art arrangement, is disposed in parallel planar relation to the sidewalls 30 of the cell. The axis of rotation A of drive magnet 22' extends perpendicular to the magnetic axis of the element 20' and to the sidewalls 30, and lies intermediate the end walls 32. In addition, the axis A is located above the lower surface 36 of the cell chamber 34 a distance greater than one half the length of the element 20'. Thus, when the drive magnet 22' is rotated about the axis A by the motor shaft 24', the stirring element 20' will be lifted above the lower surface 36 of the chamber 34 to the position shown in phantom in FIG. 3, so that the element will not contact such surface of the cell during rotation, and the element will rotate about the axis A in a plane parallel to the sidewalls 30 of the cell, as indicated by arrow 38. The axis A is so disposed that the path of rotation of the element 20' is below the optical path P' between the source of radiation 12' and the detector 14' so that the element will not interfere with the transmission of radiation through the cell.

Figure 5:
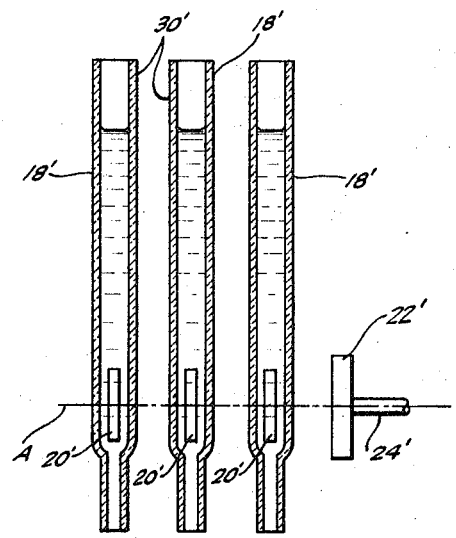
FIG. 5 illustrates three cells of the present invention stacked in parallel relationship and stirring means for the cells, such cells being shown in vertical section taken through the parallel sidewalls of the cells.

By the aforementioned stirrer arrangement, liquid in the chamber 34 follows a generally circular flow path as indicated by the arrows shown in phantom in FIG. 3. This flow has been found to minimize or virtually eliminate bubble and particulate effects, as encountered in the cell 18, by driving bubbles to the top and out of the liquid in the cell and uniformly distributing the particulate matter throughout the cell. In addition, a plurality of the cells 18' may be stacked in alignment closely adjacent one another with the sidewalls 30 of each cell lying in parallel planar relation to the like sidewalls of the next adjacent cell, as seen in FIG. 5, with only a single drive magnet 22' positioned in alignment with the cells to rotate stirring elements 20' in each cell about the axis A. This arrangement eliminates the requirement of individual drive magnets for each stirrer in a sample cell, and it is advantageous where a reference cell is needed with a sample cell, or when two or more sample cells are to be analyzed simultaneously. Furthermore, the use of one drive magnet assures that the stirring elements will rotate in synchronism and at the same speed of rotation. In the arrangement shown in FIG. 5 the source of radiation and detector of the spectrophotometric instrument are arranged relative to the cells 18' in the same manner as illustrated in FIGS. 3 and 4.

Although several embodiments of the invention have been disclosed herein for purposes of illustration, it will be understood that various changes can be made in the form, details, arrangement and proportions of the various parts in such embodiments without departing from the spirit and scope of the invention as defined by the appended claims.

What is claimed is:

1. A combination comprising:
   a plurality of sample cells, each comprising a pair of closely spaced, substantially parallel planar sidewalls and two endwalls defining a sample chamber therebetween, the cells being in juxtaposition relative to one another with the respective sidewalls of the cells disposed parallel to each other,
   a magnetic stirring element positioned in each chamber with its magnetic axis parallel to the sidewalls, and
   rotatable magnetic means positioned outside one cell for rotating the elements about a common axis perpendicular to the magnetic axes of the elements and the sidewalls, whereby the plane of rotation of each element is parallel to the sidewalls.

2. The combination of claim 9 wherein the rotatable magnetic means includes a single magnet disposed in substantially parallel planar relation to the sidewalls.

3. The combination of claim 9 wherein the endwalls of each cell are formed of a radiation permeable material.

* * * * *